United States Patent
Ziauddin et al.

(10) Patent No.: US 11,468,099 B2
(45) Date of Patent: Oct. 11, 2022

(54) AUTOMATIC CREATION AND MAINTENANCE OF ZONE MAPS

(71) Applicant: Oracle International Corporation, Redwood Shores, CA (US)

(72) Inventors: Mohamed Ziauddin, Pleasanton, CA (US); You Jung Kim, Palo Alto, CA (US); Venkatesh Sakamuri, San Mateo, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 14 days.

(21) Appl. No.: 17/068,357

(22) Filed: Oct. 12, 2020

(65) Prior Publication Data

US 2022/0114195 A1    Apr. 14, 2022

(51) Int. Cl.
  *G06F 16/28*    (2019.01)
  *G06F 16/22*    (2019.01)

(52) U.S. Cl.
  CPC .......... *G06F 16/285* (2019.01); *G06F 16/221* (2019.01); *G06F 16/2282* (2019.01)

(58) Field of Classification Search
  CPC .... G06F 16/285; G06F 11/3452; G06F 16/22; G06F 2201/81
  USPC ....................................................... 707/739
  See application file for complete search history.

(56) References Cited

U.S. PATENT DOCUMENTS

| | | | |
|---|---|---|---|
| 9,477,702 B1 | 10/2016 | Ramachandran | |
| 9,569,490 B1 | 2/2017 | Kalarikal | |
| 9,659,039 B2 * | 5/2017 | Ziauddin | ................. G06F 16/21 |
| 2002/0029207 A1 | 3/2002 | Bakalash | |
| 2005/0010564 A1 | 1/2005 | Metzger | |
| 2005/0038784 A1 | 2/2005 | Zait | |
| 2006/0253429 A1 | 11/2006 | Raghavan | |
| 2007/0233637 A1 | 10/2007 | Corvinelli | |
| 2008/0059408 A1 | 3/2008 | Barsness | |
| 2009/0019103 A1 | 1/2009 | Tommaney | |
| 2010/0235344 A1 | 9/2010 | Chandrasekar | |
| 2010/0235348 A1 | 9/2010 | Baby | |
| 2010/0281017 A1 | 11/2010 | Hu | |
| 2012/0109888 A1 | 5/2012 | Zhang | |
| 2015/0088812 A1 | 3/2015 | Ziauddin | |

(Continued)

OTHER PUBLICATIONS

Ziauddin, U.S. Appl. No. 15/987,619, filed May 23, 2018, Office Action, dated Dec. 15, 2020.
Oracle, "Create Materialized Zonemap", Oracle Database Online Documentation 12c Release dated Aug. 4, 2017, 7 pages.
Brimingham, "Zone Maps and Data Power", IBM Netezza Underground Blogs, dated Jul. 11, 2011, 7 pages.

(Continued)

*Primary Examiner* — Hung T Vy
(74) *Attorney, Agent, or Firm* — Hickman Becker Bingham Ledesma LLP

(57) ABSTRACT

Techniques for the automatic creation and maintenance of zone maps are provided. In one technique, a set of data sets is identified. For each data set, a data set width is determined based on a maximum value in the data set and a minimum value in the data set. One or more zones within the data set are identified. For each zone, a zone width is determined based on a difference between a maximum value in that zone and a minimum value in that zone. An aggregate zone width is generated that is based on the zone width of each zone. Based on the data set width and the aggregate zone width, it is determined whether to automatically generate a zone map for the data set.

20 Claims, 6 Drawing Sheets

(56) References Cited

U.S. PATENT DOCUMENTS

| | | |
|---|---|---|
| 2015/0186493 A1* | 7/2015 | Balmin ............ G06F 16/24554 707/737 |
| 2015/0286681 A1 | 10/2015 | Baer |
| 2015/0363447 A1 | 12/2015 | Dickie |
| 2016/0162548 A1 | 6/2016 | Dickie |
| 2016/0162599 A1 | 6/2016 | Dickie |
| 2016/0253379 A1 | 9/2016 | Ford |
| 2017/0177667 A1 | 6/2017 | Boehme |
| 2018/0246950 A1 | 8/2018 | Arye |
| 2018/0260439 A1 | 9/2018 | Beier |
| 2018/0300350 A1 | 10/2018 | Mainali |
| 2019/0163771 A1 | 5/2019 | Kirk |
| 2019/0236192 A1 | 8/2019 | Zou |
| 2019/0362006 A1 | 11/2019 | Ziauddin |

OTHER PUBLICATIONS

Ziauddin, U.S. Appl. No. 15/987,619, filed May 23, 2018, Office Action, dated Jun. 12, 2020.

U.S. Appl. No. 14/245,909, filed Apr. 4, 2014, Office Action, dated Mar. 22, 2016.

U.S. Appl. No. 14/245,909, filed Apr. 4, 2014, Notice of Allowance, dated Jul. 27, 2016.

Ziauddin, U.S. Appl. No. 15/987,619, filed May 23, 2018, Notice of Allowance and Fees Due, dated Jan. 4, 2022.

Ziauddin, U.S. Appl. No. 15/987,619, filed May 23, 2018, Advisory Action, dated Oct. 20, 2021.

Ziauddin, U.S. Appl. No. 15/987,619, filed May 23, 2018, Final Office Action, dated Jun. 29, 2021.

* cited by examiner

US 11,468,099 B2

AUTOMATIC CREATION AND MAINTENANCE OF ZONE MAPS

CROSS-REFERENCE TO RELATED APPLICATIONS

This application is related to U.S. patent application Ser. No. 15/987,619 filed May 23, 2018 and U.S. Pat. No. 9,507,825, the entire contents of each which are hereby incorporated by reference as if fully set forth herein.

TECHNICAL FIELD

The present disclosure relates to zone maps in databases and, more particularly, to automatically creating and maintaining zone maps.

BACKGROUND

In a database management system (DBMS) or other data storage and retrieval system, data is often stored as one or more database objects. Each database object may contain individual records, items, or sub-objects, and the data within each item may be further organized into one or more fields, elements, or attributes of the record. Each of the sub-objects may also qualify as a separate database object. In relational database systems, database objects often include tables or indexes that contain rows, and the rows are further organized into columns. In object oriented databases, database objects often include object classes that contain member objects that contain data stored as attributes or variables. Other database architectures may use other terminology, and the present disclosure is not limited to any particular type of database object.

Within a database system, a table may be divided into zones, and metadata may be maintained about the values in each zone. The metadata for the zones is collectively referred to as a "zone map". The metadata in a zone map may be used by a database server to more efficiently process queries that target the table for which the zone map was generated.

For example, assume that a table "emp" has been divided into 3 zones (Z1, Z2 and Z3). Each zone corresponds to a distinct set of contiguous rows. Further assume that table "emp" has an "age" column, and that the zone map keeps track of the MIN and MAX ages for each zone. For example, within Z1 the lowest value in the age column may be 18, while the highest value is 70. Within Z2 the lowest and highest age values may be 25 and 35, respectively. Within Z3 the lowest and highest age values may be 37 and 57, respectively.

One use of zone maps is to prune zones from consideration. For example, assume that the database server receives a query with the predicate "where age=50". By inspecting the zone map, the database server is able to determine that it is impossible for Z2 to have any row that satisfies that predicate (50 is higher than the maximum age (35) within Z2). Consequently, when processing the query, the database server will only scan the zones Z1 and Z3. In this example, zone Z2 is considered "pruned" from consideration. One technique for pruning based on zone map information is described in U.S. Pat. No. 9,507,825, referenced above.

While zone maps are useful for decreasing the time to process a query, zone maps come with a cost in terms of zone map creation and maintenance. Specifically, creating zone maps and maintaining zone maps takes many processing cycles and requires storage space. Therefore, creating a zone map for every data set (e.g., every column of every table in a database) might require significant computer costs that are not worth the savings in query processing.

One approach for determining whether to create a zone map for a set of data (e.g., a column) is for a user or database administrator to manually specify which sets of data should have zone maps created and maintained for them. However, this approach requires the user to have knowledge about the data sets and which data sets would benefit the most from zone maps.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically generating a zone map for each of one or more data sets are provided. In one technique, a data set (e.g., a column in a database table) is divided into multiple zones, each zone corresponding to a contiguous set of data within the data set. Maximum and minimum values are determined for each zone and for the data set. A clustering metric is calculated based on the maximum and minimum values to determine whether to generate a zone map for the data set. The clustering metric may be a ratio of a mean MAX/MIN width of the zones to the max/min width of the data set. If the clustering metric is above a threshold value, then a zone map is not generated; otherwise, a zone map is generated.

In a related technique, a data set may be reevaluated to determine whether to drop an existing zone map for the data set (if one already exists) or to generate a zone map (if one does not already exist for the data set).

Embodiments improve computer-related technology by devoting computer resources (e.g., CPU cycles and memory) only to data sets that have a relatively high chance of benefiting from having zone maps. Thus, the overhead of zone map maintenance may be significantly reduced, especially in environments where multiple data sets are unlikely to receive any benefit of a zone map.

Example Database System

Figure 1:
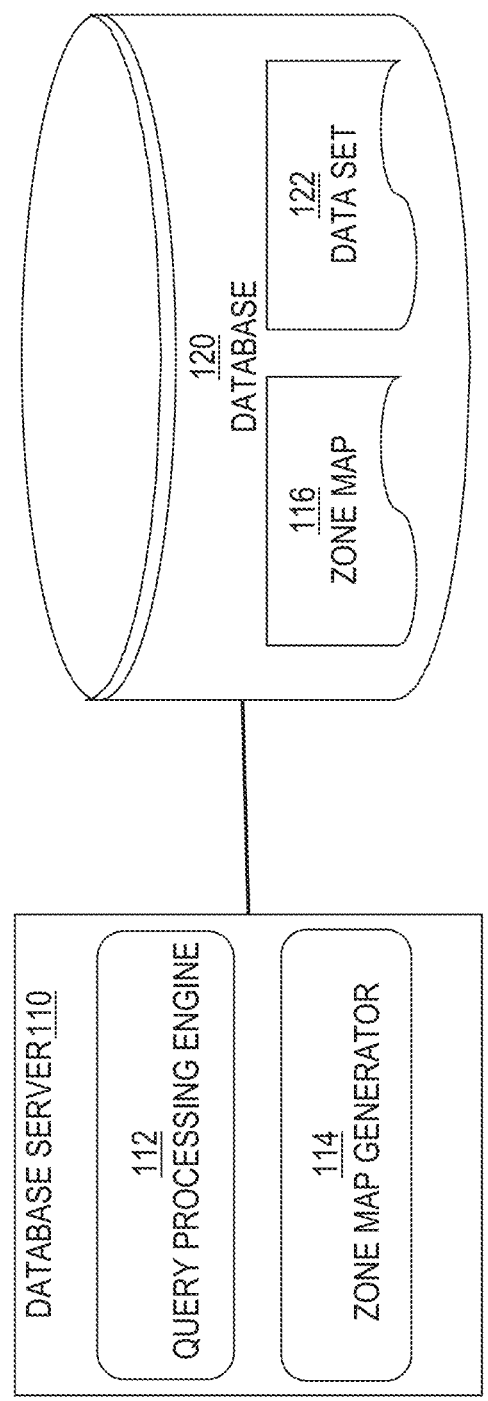
FIG. 1 is an example database system that comprises a database server and a database, in an embodiment.

FIG. 1 is an example database system 100 that comprises a database server 110 and a database 120, in an embodiment. Database system 100 may include multiple database servers (not depicted) and multiple databases (not depicted). Database system 100 may be a shared nothing database system, a shared everything database system, or a combination of both.

Database server 110 executes on one or more computing devices. Database server 110 includes a query processing engine 112, a zone map generator 114, and a zone map 116. Each of query processing engine 112 and zone map generator 114 is implemented in software, hardware, or a combination of software and hardware. Database server 110 responds to requests from one or more database clients executing on one or more computing devices (not depicted). Client requests includes requests to read data stored in database 120 and requests to update data stored in database 120, such as deleting, adding, and updating (i.e., replacing an existing value with a new value), which may be treated as a deletion followed by an insertion.

Although zone map 116 is depicted as being stored (e.g., in volatile memory) in database server 110, zone map 116 may be persistently stored in database 120. For example, zone map 116 may be generated initially in volatile memory that is local to database server 110 and then stored persistently in database 120 and later retrieved from database 120 in response to a query that targets data set 122. Also, although only a single zone map 116 is depicted, database system 100 may include multiple zone maps.

Database 120 is stored on a persistent storage device and includes data set 122. Database 120 may store one or more other data sets that are not depicted. Examples of data set 122 include a column of a table, an array of values, and a linked list. Zone map 116 is generated based on data set 122. In some embodiments, database 120 includes hundreds of columns of hundreds of tables, where each column in a subset of those columns has a zone map generated for that column.

Zone map generator 114 generates zone map 116 based on data set 122. Data set 122 is divided into multiple zones, each zone comprising a different consecutive set of data blocks. Each data block stores multiple values or data elements. Two data blocks are consecutive if no other data block is stored between the two data blocks in storage.

Query processing engine 112 uses zone map 116 when processing queries (and other types of requests) that target data in data set 122. The contents of zone map 116 may dictate whether query processing engine 112 scans data set 122 or leverages an index on data set 122 (if such an index exists) in order to process a request. Also, when query processing engine 112 determines to access data set 122 directly, query processing engine 112 uses zone map 116 to determine which zones of data set 122 (if any) may be pruned (a) from an execution plan (that query processing engine 112 generates for the request) or (b) while scanning data set 112.

Eligible Data Sets

In an embodiment, a data set is eligible to have a zone map if the data type of the data set is one in a set of eligible data types. The data within a data set is typically of the same data type. To be included in the set of eligible data types, a data type must be able to have a MAX/MIN width computed for it. Examples of eligible data types include Number, Scaled Number, Floating Point Number, Date, Timestamp, Char, and Varchar. Examples of non-eligible data types include abstract data types (or ADTs), (sometimes) hidden columns, virtual columns, and long varchar columns. A virtual column is an eligible data type if the expression representing the virtual column is made up of columns that are eligible data types.

Zone map generator 114 stores data type data (or has access to data type data) that identifies which data types are ineligible, eligible, or both. Thus, when considering whether to generate a zone map for a data set, zone map generator 114 determines a data type of the data set and determines whether that data type is in a set of eligible data types indicated in the data type data or is in a set of ineligible data types indicated in the data type data.

Candidate Data Sets

A candidate data set is one that is eligible but has not yet been determined to have a zone map generated for it. A candidate data set may be identified automatically (e.g., all eligible data sets) or manually through user input that identifies specific data sets to consider for determining whether to generate zone maps for the specific data sets.

If a data set already has a zone map created for it and it is automatically determined that the data set is not a candidate data set (for whatever reason, such as size as described herein), then the zone map may be deleted so that no more computer resources are used to store and maintain the zone map. In a related embodiment, such automatic deletion is applied only for zone maps created by an automatic determination by database server 110. Otherwise, if a zone map is created based on user input that specifies or includes an instruction to create a zone map based on a data set, then database server 110 does not delete the zone map. In such a scenario, a candidate determination is not automatically performed for such data sets.

If a data set already has a zone map created for it and it is automatically determined that the data set is (or remains) a candidate data set, then the zone map remains and may be refreshed if the zone map is "stale," or potentially contains stale data (such as a specified maximum value that might not be the actual maximum value in the data set any more, which is described in more detail below).

Data Set Size Considerations

In an embodiment, zone map generator 114 (or another component of database server 110) considers the size of a data set to determine whether to automatically classify the data set as a candidate data set. For example, if the number of rows in a column is less than a size threshold number, then the column is not a candidate data set. Conversely, if the number of rows in a column is greater than the size threshold number, then the column is a candidate data set. As another example, if the number of rows in a table is less than a threshold number, then none of the columns in the table is a candidate column. Such a size check may be performed to prevent the automatic generation of zone maps for relatively small data sets. Zone maps for relatively small data sets generally do not result in substantial data pruning, yet such zone maps incur significant maintenance overhead.

In an embodiment, zone map generator 114 (or another component of database server 110) identifies multiple candidate data sets and ranks the candidate data sets based on size, such as the number of data values in each candidate data set or the total size in bytes of each candidate data set. Zone map generator 114 analyzes larger candidate data sets first before the analyzing smaller candidate data sets to determine whether to generate a zone map for each analyzed data set. Zone maps on larger data sets are generally more effective in data pruning than zone maps on smaller data sets.

Another consideration (in addition to data set size) in determining whether to automatically classify a data set as a candidate data set is query statistics.

Clustering Metric

In an embodiment, zone map generator 114 (or another component of database server 110) generates (or calculates) one or more values of one or more clustering metrics for a data set and determines whether the one or more values satisfy one or more clustering criteria. At least one clustering metric indicates how "clustered" one or more zones of a data set are relative to the data set as a whole. A "clustered" data set may be measured in one or more ways. For example, one clustering metric is based on a MAX/MIN width of each zone and the MAX/MIN width of a data set to which the zone belongs. A MAX/MIN width of a zone or data set is a difference between the maximum value in the zone/data set and a minimum value in a zone/data set. For example, if the maximum value in a column is 97 and the minimum value in the column is 13, then the MAX/MIN width of the column is 97−13+1=85. Then, if the maximum value in a zone of the column is 63 and the minimum value in the zone of the column is 54, then the MAX/MIN width of the column is 63−54+1=10.

In an embodiment, a clustering metric for a data set is based on the MAX/MIN widths of zones in a data set relative to the MAX/MIN width of the data set. For example, if the mean MAX/MIN widths of zones of a column is 57 and the MAX/MIN width of the column is 84, then a value for the clustering metric is $57/84$ or 67.8%. Based on this definition of the clustering metric, the higher the value of the clustering metric, the less clustered the data set is and the less likely a zone map would be helpful in pruning zones during processing of a database statement, such as a query or a data manipulation language (DML) statement.

Aggregations other than mean MAX/MIN zone width may be used to generate an aggregated zone width for a set of zones in a data set. For example, a median MAX/MIN zone width may be determined. Alternatively, a $70^{th}$ percentile zone width may be determined. Whatever aggregation method is used, such a method may be a default method or a user-specified method, such as by a database administrator.

The value of the clustering metric may be compared to a clustering threshold. An example clustering threshold is 50%. If the value of the clustering metric is greater than the clustering threshold, then the corresponding data set is not considered clustered and a zone map is not generated for the data set. (However, as described in more detail below, a zone map may eventually be generated for the data set if the content of the data set changes such that the data set becomes clustered.) Conversely, if the value of the clustering metric is equal to or less than the clustering threshold, then the corresponding data set is considered clustered and a zone map is generated for the data set (or is maintained, if a zone map already exists for the data set).

The clustering threshold may be a default value (e.g., 50%) and, optionally, a value that is modifiable, such as by a database administrator. Different data sets may be associated with different clustering thresholds.

Other clustering metrics may be used to determine whether a data set is sufficiently clustered in order to address certain types of data distributions within a data set. For example, a data set may have a relatively narrow range except for one or two values that are outliers. For example, the MAX/MIN width of a column may be 95, but all but two values may be in a MAX/MIN width of 20. Thus, when calculating the clustering metric described herein, it is likely that mean (or median) MAX/MIN zone width is relatively small compared to 95. However, if the mean MAX/MIN zone width is 18, then it is unlikely that many zones, if any, would be pruned when processing a database statement that targets the data set.

Thus, in an embodiment, a standard deviation metric or a variance metric is computed for a data set and used to determine whether to generate a zone map for the data set. The standard deviation is a measure of the amount of variance or dispersion of a set of values in a data set. A low standard deviation indicates that the values tend to be close to the mean of the data set, while a high standard deviation indicates that the values are spread out over a wider range.

For example, instead of computing the actual MAX/MIN width of a data set, the MAX/MIN of two standard deviations are computed and difference between that MAX and MIN represents the MAX/MIN width of the data set. Two standard deviations encompass about 95% of the values in a data set. Implementing a standard deviation approach (or a variance approach where a variance is computed and used to reduce the actual MAX/MIN width of a data set) effectively removes (potentially infrequent) outliers from a data set when calculating the MAX/MIN width of the data set.

Maintaining MAX/MIN Aggregates on Load

Information about a data set may be generated as data is loaded into the data set. For example, as rows from a data source are loaded into a table, one or more automatic processes maintain MAX/MIN aggregates of eligible columns in a memory buffer. In an embodiment, if the size of the data set is known beforehand (i.e., before loading data into the data set begins) and the size is less than a size threshold, then the process does not maintain MAX/MIN aggregates for the data set. MAX/MIN aggregates are MAX/MIN values for one or more zones of a data set. Depending on the implementation, multiple MAX/MIN aggregates may be calculated for the same zone of a data set. However, when zone map creation completes, each zone in the zone map will only have a single MIN/MAX aggregate.

While the following example is in the context of loading data into a table, embodiments include loading data into any data structure (or set of data structures) that holds data of a data set.

Loading data from a data source (such as a file or a remote database) into a table may be performed by one or more processes. If a single process performs the loading, then the process records MAX/MIN aggregates in a single temporary data structure, from which zone MAX/MIN widths and data set MAX/MIN widths are calculated. Initially, the temporary data structure is empty or contains multiple empty entries, each entry corresponding to a zone. Also, the process identifies that a table that includes one or more eligible columns. If there are ten eligible columns, then each entry in the temporary data structure contains at least twenty-one values: one value indicating a zone identifier and twenty values for storing the MAX/MIN values of the ten eligible columns. Each entry may also contain a value that indicates a number of rows that corresponds to the zone indicated by that entry.

Figure 2:
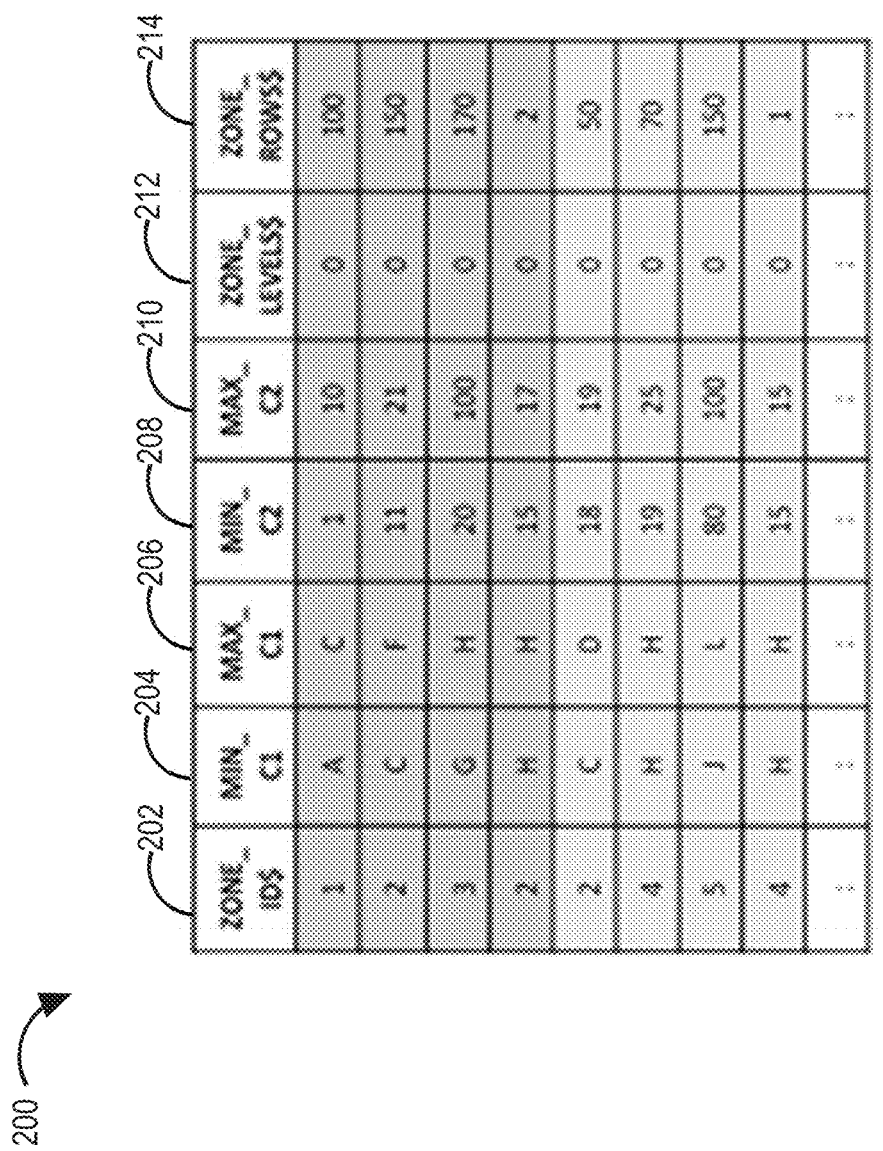
FIG. 2 depicts an example of a temporary table that contains MAX/MIN aggregates for different columns in a base table, in an embodiment.

FIG. 2 depicts an example of a temporary table 200 that contains MAX/MIN aggregates for different columns in a base table, in an embodiment. Temporary table 200 includes columns 202-214. In this example, there are two eligible columns: C1 and C2. Column 202 indicates a zone identifier, column 204 indicates a minimum value of column C1 based on the rows that have the corresponding zone identifier, column 206 indicates a maximum value of column C1 based on the rows that have the corresponding zone identifier, column 208 indicates a minimum value of column C2 based on the rows that have the corresponding zone identifier, column 210 indicates a maximum value of column C2 based on the rows that have the corresponding zone identifier, column 212 indicates a zone level, and column 214 indicates a number of rows that have been read in for the corresponding zone identifier.

In this example, two entries or rows in temporary table 200 correspond to zone identifier 2. This situation may be possible if the data source from which the data is read does not necessarily store the data in zone order to begin with. Thus, temporary table 200 indicates that the first one hundred consecutive rows that have been read in are from zone 1, the next one hundred and fifty consecutive rows that have been read in are from zone 2, the next one hundred and seventy consecutive rows that have been read in are from zone 3, and the last two rows that have been read in are from zone 2.

After the automatic process identifies the eligible columns, the process then begins reading rows from the data source and, for each row, determines a zone to which the row belongs. For each row after the first row, if the zone of that row is the same as the zone of the last considered row, then the process determines whether the MAX/MIN aggregates of the zone should be updated based on the value(s) of the eligible column(s) of that row. If the zone is the not the same as the zone of the last considered row, then the process writes the value(s) as MAX or MIN values in a new entry in the temporary data structure. This might occur since the disk address or location of a row determines the zone to which the row belongs. Thus, the current row may be placed in a location that is different from the location of the previous row. These two locations may belong to the same zone or two different zones.

In some situations, when reading data from a data source into a memory buffer, a first row is mapped to a first zone, a subsequent row is mapped to a second zone, and then a subsequent row is mapped to the first zone again. This is possible due to the order in which various rows are placed in different locations on disk. For example, the first few hundred rows might be placed in a disk location that maps to a first zone, the next few hundred rows might be placed in another disk location that maps to a second zone, and then the next few hundred rows might be placed in the previous disk location because that previous disk location was not initially filled to capacity.

For each eligible column, the process determines a value from the row that corresponds to the eligible column. If the process determines that the value is greater than the current maximum value (if not NULL) associated with the eligible column, then the process updates the current maximum value associated with the eligible column with the value. If the process determines that the value is less than the current minimum value (if not NULL) associated with the eligible column, then the process updates the current minimum value associated with the eligible column with the value.

Figure 3:
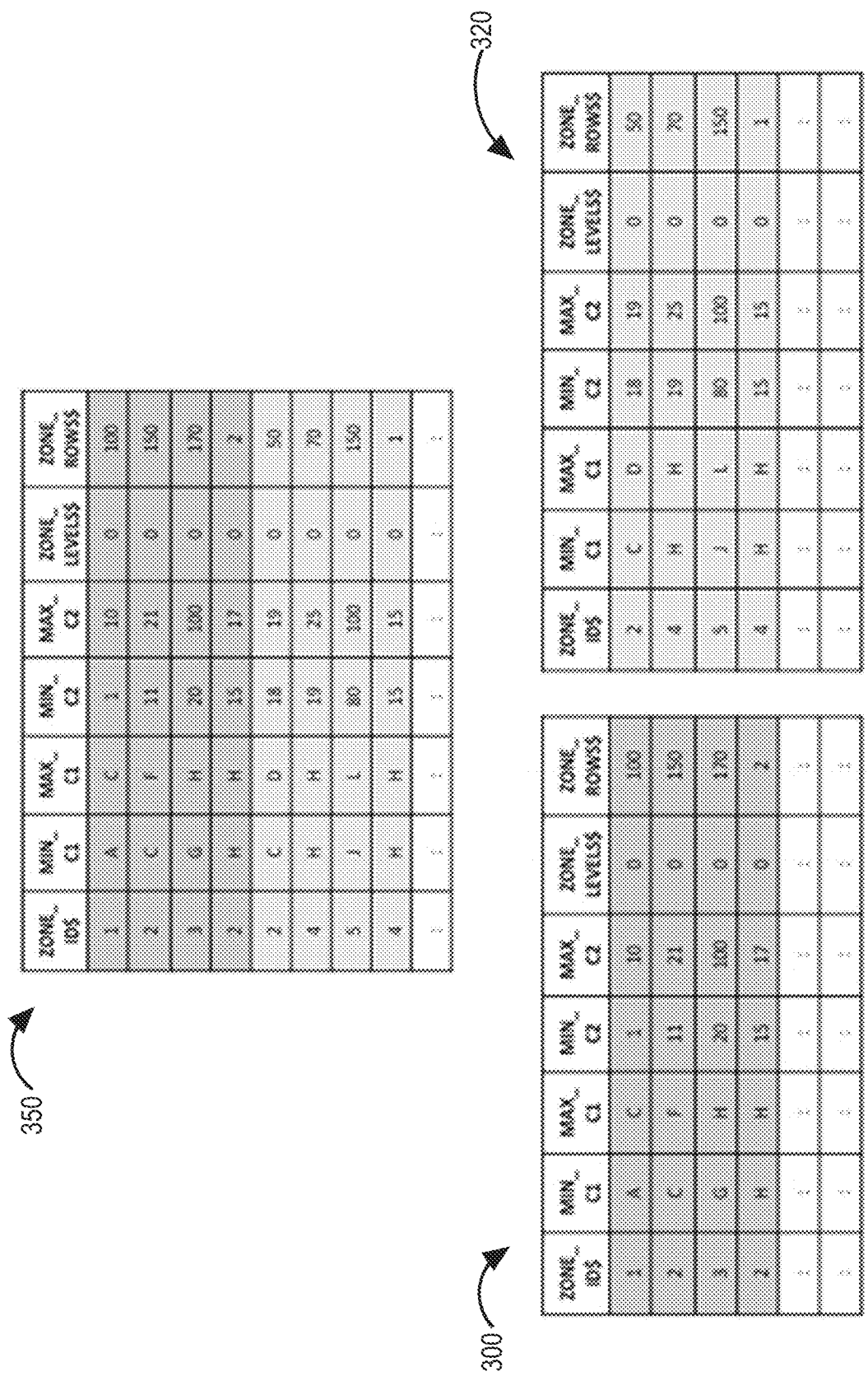
FIG. 3 depicts two example memory buffers, one for each of two different processes, and a temporary table that combines the contents of the memory buffers, in an embodiment.

In an embodiment, multiple automatic (e.g., slave) processes load data into the same table. The loading may be from the same data source or from different data sources. FIG. 3 depicts two example memory buffers 300 and 320, one for each of two different processes, and a temporary table 350 that combines the contents of the memory buffers, in an embodiment. Memory buffers 300 and 320 are similar in structure as temporary table 200. In fact, memory buffer 300 contains the identical information as temporary table 200. Once the processes finish loading the data from the one or more data sources into the same table, temporary table 350 is created by combining the data from memory buffers 300 and 320. This may be done by creating an empty temporary table 350 and then loading, into temporary table 350, the data sequentially from memory buffers 300 and 320. Alternatively, the data from memory buffer 320 is concatenated to the data in memory buffer 300. Either way, temporary table 350 contains MIN/MAX aggregate rows for all zones pertaining to the new data loaded collectively by the multiple processes.

Automatic Creation of a Zone Map

Once it is determined that an eligible data set satisfies clustering criteria (e.g., a clustering metric value that is less than a clustering threshold), then a zone map is automatically generated for the data set. For example, if a table includes two eligible columns that satisfy the clustering criteria, then a single zone map is generated and includes MAX/MIN information about the two columns. If none of the eligible columns satisfies the clustering criteria, then no zone map is generated.

A zone map may be generated using an automatically generated DDL (data definition language) statement. An example of a DDL statement is the following:
   CREATE MATERIALIZED ZONEMAP ZMAP_LINEORDER ON LINEORDER (SHIPDATE)
where "CREATE ZONEMAP" is the operation, "ZMAP_LINEORDER" is the name of the zone map, "LINEORDER" is the name of the database object (e.g., table) that contains the data set for which the zone map is generated, and "SHIPDATE" is the name of the data set, which may be a column within the database object.

In an embodiment, a zone map is initially generated as an empty table comprising MIN/MAX aggregates of one or more identified well-clustered data sets, plus other metadata columns. Using the MIN/MAX aggregate rows in a temporary table (e.g., temporary table 350), a loading process (e.g., a query coordinator (QC) in the case of a parallel data load) executes an INSERT statement that selects from temporary table recomputing new MIN/MAX aggregates per zone and stores them into the newly created empty zone map table.

As described previously, the temporary table may contain multiple rows created by the same or different processes for the same zone; thus, those rows are grouped into a single zone row (e.g., "GROUP BY zone_id") via re-computation during the insert into the zone map table. The INSERT statement is lightweight as it queries only the temporary table that contains heavily aggregated MIN/MAX data (e.g. all rows belonging to the same zone are aggregated into one row, where a zone is made up of multiple (e.g., 1,024) consecutive data blocks, and each data block contains many (e.g., one hundred) rows).

Maintenance of Existing Zone Maps in Response to Bulk Loads

Sometimes, a large amount of data (e.g., many megabytes or gigabytes) is loaded into one or more data sets at a time. For example, data from a remote database may be loaded into an existing table. Such a load is considered a "bulk load."

As data is bulk loaded into a data set for which a zone map exists, the zone map is eventually refreshed to reflect the newly loaded data. At least some of the newly loaded data might be placed on disk at locations that can belong to existing zones. Before the bulk load occurs, a temporary table and zero or more memory buffers are generated to store intermediate MAX/MIN aggregates per zone as data is read from one or more data sources into one or more existing data sets, for which the zone map exists.

After the bulk load completes, the existing zone map and the temporary table are concurrently stored. Data from the temporary table is used to update the zone map. For example, data from the temporary table is merged into the zone map. As a specific example, a process executes a MERGE statement to re-compute new MAX/MIN aggregates per zone. Ultimately, whichever technique is used to merge the MAX/MIN aggregates from the temporary table with the zone map, those MAX/MIN aggregates are compared to their corresponding MAX/MIN values per zone in the zone map. For example, if the MAX value of one column indicated in the temporary table is larger than the MAX of the corresponding column indicated in the zone map, then the zone map is updated with that MAX value from the temporary table. Similarly, if the MIN value of one column indicated in the temporary table is smaller than the MIN of the corresponding column indicated in the zone map, then the zone map is updated with that MIN value from the temporary table.

A MERGE statement is lightweight compared to SQL refresh statements used by a post-commit method. The MERGE statement accesses a far smaller zone map table and a far smaller temporary table that is created during the bulk load in comparison to the post-commit refresh method, which involves accessing the base table to compute MIN/MAX aggregates for the new data that has been already loaded and committed.

Maintenance of Existing Zone Maps in Response to Non-Bulk Load Changes

Data in a data set may be updated in small ways. Such changes may be considered non-bulk load changes. An example of a non-bulk load change is a DML statement that results in relatively few changes, such as a few hundred inserts or updates.

A deletion of a value from a data set does not require an immediate update of a zone map that has been generated for the data set. While the MAX/MIN width of the zone to which the value belongs and the overall MAX/MIN width may no longer be accurate, the zone map may still be used to prune the zone during database statement (e.g., query) processing.

However, an insertion of a value to a data set or an update to an existing value may cause the zone map for the data set to be no longer valid. For example, if the maximum value of a column is 56, a new value that is inserted into the column is 96, and the maximum value is not updated, then a zone map for the column will be (incorrectly) pruned in response to a query that requests values from the column that are greater than 56, unless the zone map is immediately updated or the zone map for the column (or for the zone to which the new value is added) is indicated as stale, in which case the zone map would not be used (at least for the zone) to respond to the query.

In an embodiment, as data is added to a data set for which a zone map exists, the zone map is (eventually) refreshed to reflect the added data. A zone map may be refreshed synchronously or asynchronously with changes to the data set.

A synchronous refresh is one where an insertion of a value into a data set or an update of a value in a data set is immediately followed by a check of the zone map to determine whether the zone map needs to be refreshed. The check is performed before the process (that performed the insertion or update) completes. A "completed" process that inserts/updates a value means that the value is visible to other processes. Conversely, an "incomplete" process that inserts/updates a value means that the value (though new or updated) is not yet visible to other processes. In the context of transaction-based data systems, the check (and any refresh) is performed within the same transaction as the one in which the insert/update is made. Thus, the check and any refresh are performed before that transaction commits.

A first variation of synchronous refresh is where the refresh operation is performed in response to each insertion of a row, while a second variation of synchronous refresh is where the refresh operation is performed once at the end of the transaction after all insertions have been performed.

An asynchronous refresh is one that is performed sometime after an insertion or update completes. Before the insertion/update completes, a zone map associated with the updated data set is indicated as "stale." This indication may be through a flag or bit where, for example, '1' indicates "fresh" and '0' indicates "stale." A "stale" zone map is one that should not be used for pruning. Instead of being associated with an entire data set, the "stale" indication may be associated only with the zone that was updated with a new value. Thereafter, when there are one or more subsequent requests for access (e.g., in the form of a database statement) to the data set and the zone map may be used to process the requests, a check of the zone map is triggered. If the zone map is "stale," then the zone map is not used to process the requests. If just a subset of the zones in the zone map are "stale," then those zones are not pruned. In other words, the MAX/MIN values for any "stale" zones (if the staleness is made on a per zone basis) are not consulted or none of the MAX/MIN values of the "stale" data set are consulted (if the staleness is on a per data set basis). In the context of transactional based data systems, the asynchronous refresh is performed in a transaction that is different than the transaction in which the insert/update was made.

In an embodiment, some refreshes of a zone map are synchronous and other refreshes of the zone map are asynchronous. One or more factors may be considered when determining whether a particular refresh is to be synchronous or asynchronous. One example factor is how often a zone map is used by queries. For example, synchronous refresh may be used for frequently used zone maps and asynchronous refresh may be used for infrequently used zone maps.

Automatic Zone Map Generation for Existing Data Sets

In an embodiment, a zone map is automatically generated for an existing data set, i.e., not in response to creation of a new data set. Such automatic generation may be performed by one or more background processes, as opposed to a foreground user process. Automatically generating a zone map for an existing data set may arise for multiple reasons. One possible reason is that a database that includes the data set is upgraded from an older version of the database in which the automatic zone map generation was not present or the feature was not turned on.

Another possible reason is that a new data set (e.g., a new table) is created but initial data for the new data set is added by conventional DML. If default automatic zone map generation is tied to an initial data load, then a newly created data set will be left without a zone map. Therefore, in an embodiment, a background process (or computing job) targets such existing data sets for automatic zone map generation.

Another possible reason that an automatic zone map has not yet been generated for an existing data set is size of the data set. For example, if the size of a new data set does not exceed a (e.g., configurable) size threshold (as described herein) (e.g., five thousand blocks), then a zone map is not generated for the data set. The size threshold may be configurable.

Another possible reason that an automatic zone map has not yet been generated for an existing data set is if the data set is originally not well clustered, but the data set becomes sufficiently clustered over time as new data is added to the data set. For example, if a data set is not well-clustered, but newly loaded data is well clustered, then the overall clustered-ness is sufficient to automatically generate a zone map for the updated data set.

After the background process identifies the candidate tables (i.e. eligible tables without zone map and their size exceeding the threshold), the background process may samples data from them to identify eligible columns containing clustered data. Rows belonging to a table are stored in a set of disk blocks. Each block has a unique location on disk representing its disk address. Thus, all rows belonging to same block have same disk location or disk address. To sample, a subset of blocks are chosen randomly. For example, regardless of the size of the table (i.e. the number of blocks) a fixed number of blocks may be randomly selected. As a specific example, five thousand blocks are randomly selected. The background process then computes MIN/MAX aggregates on eligible columns per zone from the sampled data and applies the clustering ratio check to identify well-clustered columns. When one or more eligible columns with clustered data are found for a candidate table, the background process executes a create zone map DDL statement to create an automatic zone map. When multiple candidate tables are found, the background process may rank them in descending order of their respective table sizes and create automatic zone maps on the candidate tables in that order. The ranking may be based on multiple criteria, such as table size and number of accesses to the table.

Reevaluation of Automatic Zone Maps

After a zone map is automatically generated, if the data distribution changes in the corresponding data set, then the zone map may require reorganization. Without reevaluating the continued usefulness of a zone map, the costs of maintenance of the zone map may exceed the benefits of the zone map. For example, if the data within a data set eventually becomes no longer clustered, then very few, if any, zones may be pruned when processing a query against the data set.

In an embodiment, a zone map is automatically reevaluated to determine whether the data within the corresponding data set remains sufficiently clustered. Zone map generator 114 (or a separate component of database server 110) may perform automatic reevaluation. Reevaluating a zone map involves computing clustering measures for the corresponding data sets. For example, if a newly computed clustering ratio of a data set no longer satisfies a clustering threshold, then the corresponding zone map is discarded. Conversely, if the newly computed clustering ratio satisfies the clustering threshold, then the corresponding zone map is maintained, or a zone map is created if none exists before.

In an embodiment, a single zone map is created on a table to maintain MIN/MAX information for one or more data sets, each data set corresponding to a column of the table. The single zone maps may, thus, include multiple sets of MIN/MAX aggregates, each set of MIN/MAX aggregates corresponding to a different column of the table. For example, if a new clustering ratio of a data set within a table no longer satisfies a clustering threshold, then the MIN/MAX aggregates associated with that data set are discarded or removed from the single zone map, but the other MIN/MAX aggregates (corresponding to other data sets, within the table, that are clustered) are retained. Similarly, if a new clustering ratio satisfies the clustering threshold but there is no corresponding MIN/MAX aggregate in the automatic zone map then it is added to the zone map.

In an embodiment, reevaluation of an existing zone map may occur periodically or in response to certain events. One example event includes user (e.g., database administrator) input that explicitly requests a reevaluation of a specific zone map or for a group of (e.g., all) zone maps. Another example event includes a threshold number of changes to a corresponding data set. For example, if over 5% of the data within a data set has changed (e.g., added, deleted, or updated), then the corresponding zone map is reevaluated. Such events may be used as triggers to reevaluate a past decision to not create a zone map for a particular data set.

Examples of a periodic reevaluation include a monthly, weekly, or daily reevaluation of each zone map. The order in which the zone maps are reevaluated may be based on size of the corresponding data sets or popularity of the corresponding data sets (e.g., in the number of queries that target each data set or number of update statements that target each data set).

In a related embodiment, zone map generator 114 (or another component) performs event-based reevaluation and periodic reevaluation. If a zone map is automatically reevaluated in response to a particular event occurring, then the time for the next periodic reevaluation is updated. For example, if a zone map is periodically automatically reevaluated every two days and zone map generator 114 determines to evaluate the zone map twelve hours since the last reevaluation in response to detecting an reevaluation-triggering event, then the next periodic reevaluation of the zone map will not occur until two days after the most recent reevaluation, instead of two days after the last periodic reevaluation.

Example Process

Figure 4:
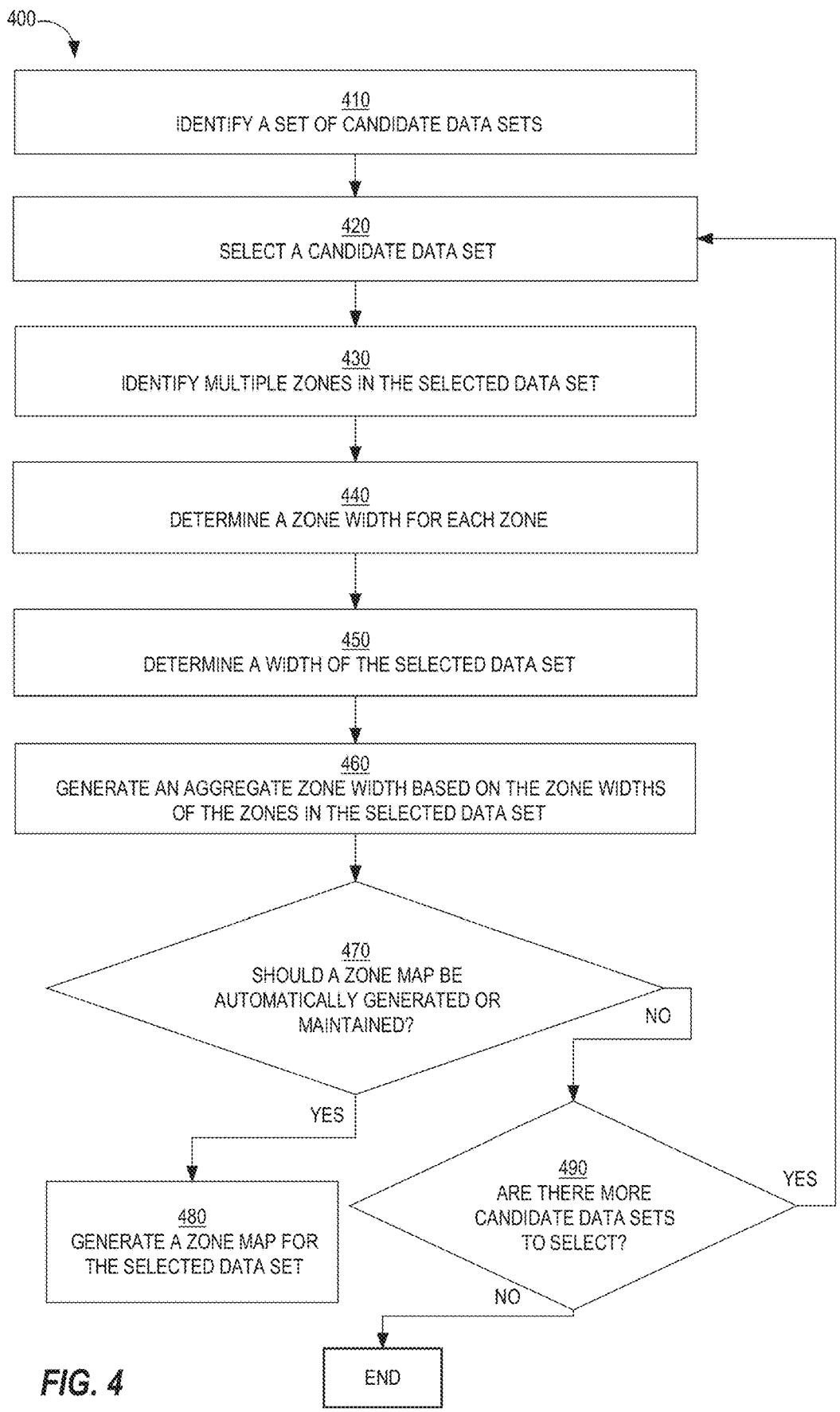
FIG. 4 is a flow diagram that depicts an example process for automatically generating and maintaining a zone map, in an embodiment.

FIG. 4 is a flow diagram that depicts an example process 400 for automatically generating and maintaining a zone map, in an embodiment. Process 400 may be implemented by zone map generator 114 and zero or more other components of database server 110. Process 400 may be triggered based on user input, automatically when a new data set is created in database system 100, automatically when a certain event occurs (e.g., the number of changes to an existing data set since a most recent evaluation of the data set or a most recent evaluation of a zone map of the data set), or automatically on a period basis.

At block 410, a set of candidate data sets is identified. For example, the set of candidate data sets may be existing data sets in database 120 or may be data sets whose contents do not yet exist in database 120 but will be populated as part of a load operation. The candidate data sets may be columns of one or more tables.

Block 410 may involve determine whether each data set (whether new or existing) is greater than a certain size and/or whether each data set contains data of an eligible data type. If the result to both of these determinations is positive, then the data set is considered a candidate data set.

At block 420, a candidate data set is selected. Block 420 may involve selecting a candidate data set randomly or selecting the candidate data set based on one or more criteria, such as selecting the largest candidate data set or selecting the candidate data set that has the most changes.

At block 430, multiple zones are identified within the selected data set. The entire data set may be considered in block 430 or a sample of the data set in terms of blocks may be considered in block 430.

At block 440, for each zone, a zone width of the zone is determined based on a difference between a maximum value in the zone and a minimum value in the zone.

At block 450, a "width" of the selected data set is determined. Block 450 may involve determining (1) a minimum value of all MIN aggregate values computed in block 440 and (2) a maximum value of all MAX aggregate values computed in block 440, and then computing a difference between those two values in order to determine the "width" of the data set.

At block 460, an aggregate zone width is generated that is based on the zone widths of the zones. For example, block 460 may involve computing an average of all the zone widths computed in block 440.

At block 470, based on the width of the data set and the aggregate zone width, it is determined whether a zone map for the data set should be automatically generated. Block 470 may involve computing a ratio of the aggregate zone width to the width of the data set and determining whether the ratio is below a certain threshold. If the determination in block 470 is positive, then process 400 proceeds to block 480 where a zone map is generated for the candidate data set. Otherwise, process 400 returns to block 420 where another candidate data set is selected.

At block 490, it is determined whether there are any more candidate data sets to select. If so, then process 400 returns to block 420. Otherwise, process 400 ends.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
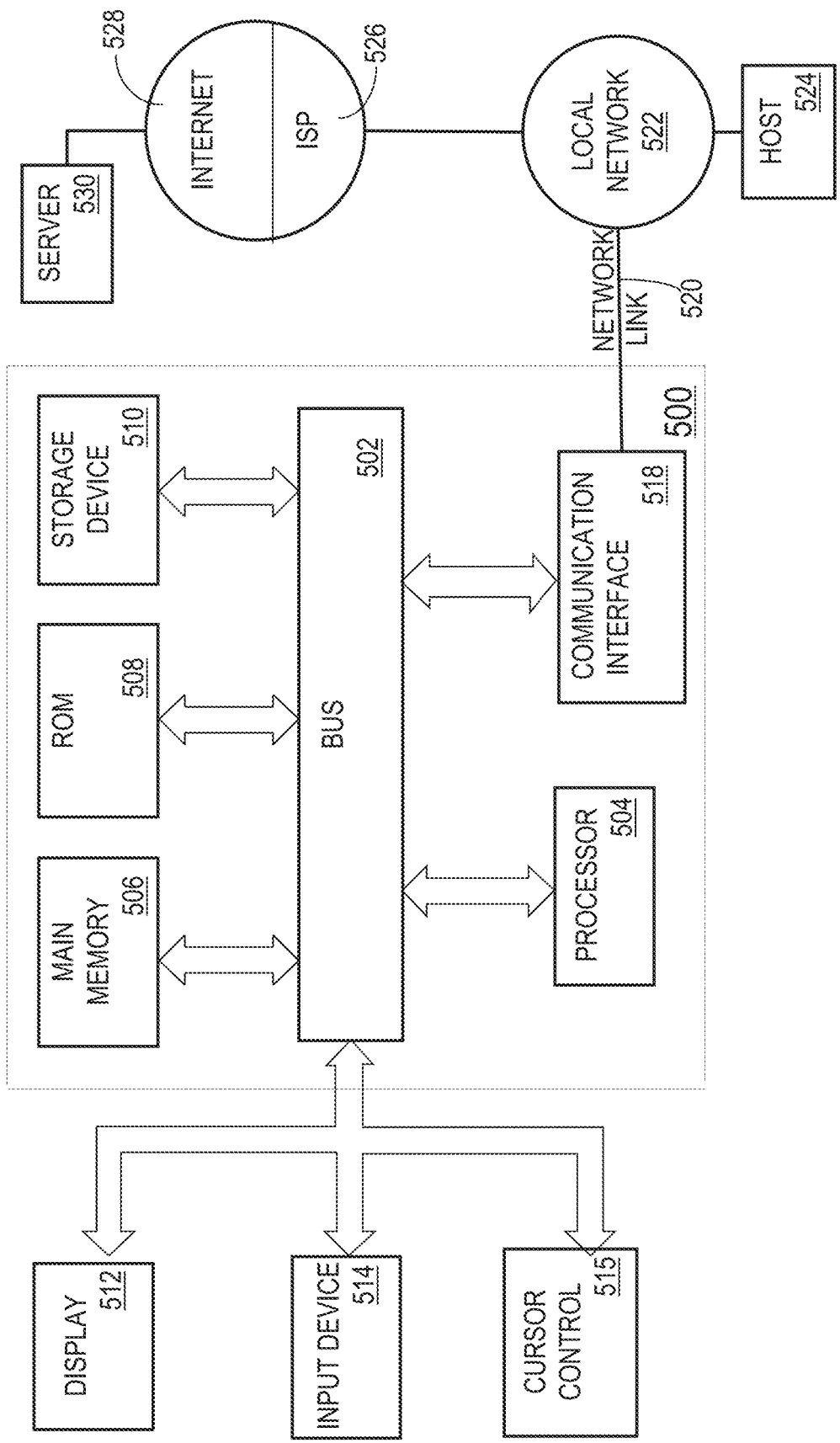
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
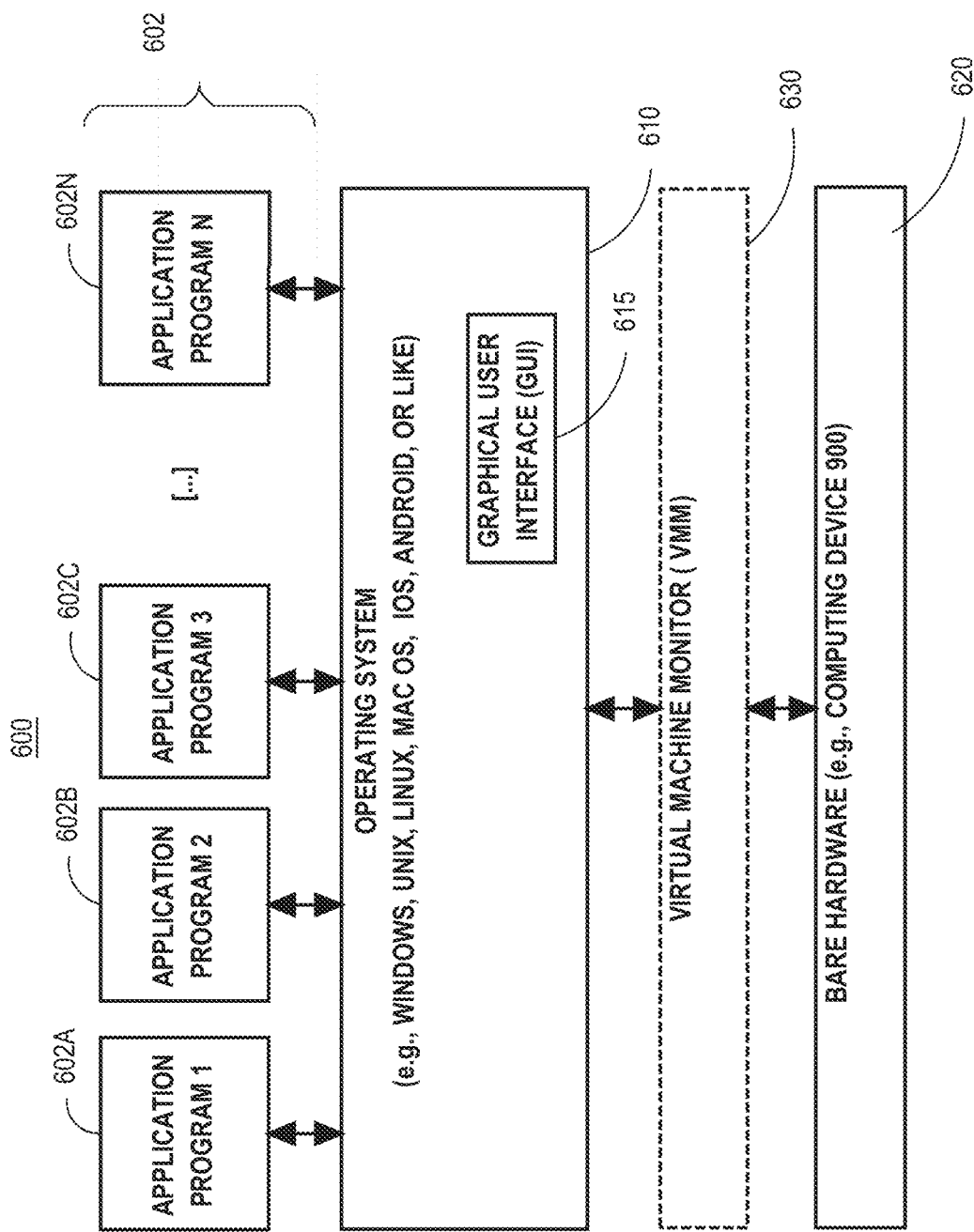
FIG. 6 is a block diagram of a basic software system that may be employed for controlling the operation of the computer system.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a set of data sets;
   for each data set in the set of data sets:
   determining, based on analyzing the said each data set in computer memory, a data set width of said each data set based on a maximum value in said each data set and a minimum value in said each data set;
   identifying one or more zones within said each data set;
   for each zone in the one or more zones, determining a zone width of said each zone based on a difference between a maximum value in said each zone and a minimum value in said each zone;
   generating an aggregate zone width that is based on the zone width of each zone of the one or more zones;
   based on the data set width and the aggregate zone width, determining whether to automatically generate, in volatile memory, a zone map for said each data set;
   wherein the method is performed by one or more computing devices.

2. The method of claim 1, further comprising:
   receiving user input that specifies each data set in a subset of the set of data sets.

3. The method of claim 1, further comprising:
   determining a clustering ratio based on the aggregate zone width and the data set width;
   performing a comparison of the clustering ratio and a clustering threshold;
   based on a result of the comparison, generating the zone map for said each data set.

4. The method of claim 1, further comprising:
   determining to load data into a table, wherein the data comprises a plurality of rows;

in response to determining to load the data into the table, for each row in the plurality of rows:
  identifying a particular column of said each row;
  determining whether a column value in the particular column is less than a first minimum value that is associated with the particular column or greater than a first maximum value that is associated with the particular column;
  replacing the first minimum value with the column value if the column value is less than the first minimum value of the particular column;
  replacing the first maximum value with the column value if the column value is greater than the first maximum value of the particular column.

5. The method of claim 4, further comprising:
storing the first minimum value and the first maximum value in a first row of a memory buffer that comprises multiple rows, each of which includes a zone identifier that identifies a zone of the one or more zones;
storing a reference to the first row in the memory buffer;
for each row in the plurality of rows of the data:
  identifying a particular zone associated with said each row;
  determining whether the particular zone is identified by the zone identifier included in the first row;
  if the particular zone is not identified by the zone identifier, then updating the reference to reference a second row, in the memory buffer, that is subsequent to the first row in the memory buffer.

6. The method of claim 4, further comprising, while loading the data into the table:
storing, by a first process, in a first memory buffer, first zone width data for a particular zone;
storing, by a second process that is different than the first process, in a second memory buffer that is different than the first memory buffer, second zone width data for the particular zone;
moving, from the first memory buffer, into a temporary table, the first zone width data for the particular zone;
moving, from the second memory buffer, into the temporary table, the second zone width data for the particular zone, wherein moving the second zone width data comprises determining whether to update the first zone width data based on the second zone width data.

7. The method of claim 1, further comprising:
storing a temporary table that comprises a plurality of rows, each of which corresponds to a zone of a plurality of zones and stores minimum and maximum data for a particular data set;
wherein the plurality of rows includes (1) a first row that corresponds to a particular zone of the plurality of zones and stores first minimum and maximum data for the particular data set and (2) a second row that corresponds to the particular zone and stores second minimum and maximum data that is different than the first minimum and maximum data,
in response to determining to automatically generate a zone map for the particular data set, aggregating the first and second minimum and maximum data to generate aggregated minimum and maximum data for the particular zone.

8. The method of claim 1, wherein the one or more zones are a plurality of zones, further comprising:
after generating the zone map, generating respective updated zone widths for one or more zones of the plurality of zones;
generating an updated aggregated zone width based on the respective updated zone widths;
based on the updated aggregated zone width, determining whether to delete the zone map.

9. The method of claim 1, further comprising:
determining a size of a table to which a particular data set belongs;
comparing the size of the table to a size threshold;
in response to determining that the size of the table does not exceed the size threshold, determining to not include the particular data set in the set of data sets.

10. The method of claim 1, wherein a type of the aggregate zone width is one of mean, median, variance, or standard deviation, or a combination thereof.

11. The method of claim 1, further comprising:
determining whether a size of a particular data set exceeds a size threshold;
in response to determining that the size of the particular data set exceeds the size threshold, sampling data from the particular data set to generate a sample of the particular data set;
computing first width data from the sample;
computing second width data for each zone in the sample;
computing aggregate zone width data based on the second width data for each zone in the sample;
based on the first width data and the aggregate zone width data, determining whether to automatically generate a zone map for the particular data set.

12. One or more non-transitory storage media storing instructions which, when executed by one or more computing devices, cause:
identifying a set of data sets;
for each data set in the set of data sets:
  determining, based on analyzing said each data set in computer memory, a data set width of said each data set based on a maximum value in said each data set and a minimum value in said each data set;
  identifying one or more zones within said each data set;
  for each zone in the one or more zones, determining a zone width of said each zone based on a difference between a maximum value in said each zone and a minimum value in said each zone;
  generating an aggregate zone width that is based on the zone width of each zone of the one or more zones;
  based on the data set width and the aggregate zone width, determining whether to automatically generate a zone map for said each data set.

13. The one or more non-transitory storage media of claim 12, wherein the instructions, when executed by the one or more computing devices, further cause:
receiving user input that specifies each data set in a subset of the set of data sets.

14. The one or more non-transitory storage media of claim 12, wherein the instructions, when executed by the one or more computing devices, further cause:
determining a clustering ratio based on the aggregate zone width and the data set width;
performing a comparison of the clustering ratio and a clustering threshold;
based on a result of the comparison, generating the zone map for said each data set.

15. The one or more non-transitory storage media of claim 12, wherein the instructions, when executed by the one or more computing devices, further cause:
determining to load data into a table, wherein the data comprises a plurality of rows;

in response to determining to load the data into the table, for each row in the plurality of rows:

identifying a particular column of said each row;

determining whether a column value in the particular column is less than a first minimum value that is associated with the particular column or greater than a first maximum value that is associated with the particular column;

replacing the first minimum value with the column value if the column value is less than the first minimum value of the particular column;

replacing the first maximum value with the column value if the column value is greater than the first maximum value of the particular column.

16. The one or more non-transitory storage media of claim 12, wherein the instructions, when executed by the one or more computing devices, further cause:

storing a temporary table that comprises a plurality of rows, each of which corresponds to a zone of a plurality of zones and stores minimum and maximum data for a particular data set;

wherein the plurality of rows includes (1) a first row that corresponds to a particular zone of the plurality of zones and stores first minimum and maximum data for the particular data set and (2) a second row that corresponds to the particular zone and stores second minimum and maximum data that is different than the first minimum and maximum data, in response to determining to automatically generate a zone map for the particular data set, aggregating the first and second minimum and maximum data to generate aggregated minimum and maximum data for the particular zone.

17. The one or more non-transitory storage media of claim 12, wherein the one or more zones are a plurality of zones, wherein the instructions, when executed by the one or more computing devices, further cause:

after generating the zone map, generating respective updated zone widths for one or more zones of the plurality of zones;

generating an updated aggregated zone width based on the respective updated zone widths;

based on the updated aggregated zone width, determining whether to delete the zone map.

18. The one or more non-transitory storage media of claim 12, wherein the instructions, when executed by the one or more computing devices, further cause:

determining a size of a table to which a particular data set belongs;

comparing the size of the table to a size threshold;

in response to determining that the size of the table does not exceed the size threshold, determining to not include the particular data set in the set of data sets.

19. The one or more non-transitory storage media of claim 12, wherein the instructions, when executed by the one or more computing devices, further cause:

determining whether a size of a particular data set exceeds a size threshold;

in response to determining that the size of the particular data set exceeds the size threshold, sampling data from the particular data set to generate a sample of the particular data set;

computing first width data from the sample;

computing second width data for each zone in the sample;

computing aggregate zone width data based on the second width data for each zone in the sample;

based on the first width data and the aggregate zone width data, determining whether to automatically generate a zone map for the particular data set.

20. A database system comprising:

a database storing one or more data sets that includes a data set;

one or more database servers, each comprising one or more processors and one or more storage media storing instructions which, when executed by the one or more processors, cause:

prior to generating a zone map for the data set, automatically performing an analysis, in computer memory, of data items within one or more zones of the data set;

based on the analysis, automatically generating a zone map for the data set and storing the zone map in the database.

* * * * *